(12) United States Patent
Bestle

(10) Patent No.: US 7,831,037 B2
(45) Date of Patent: Nov. 9, 2010

(54) FOUR COLUMN KEYPAD

(75) Inventor: Nikolaj Bestle, Copenhagen (DK)

(73) Assignee: Nokia Corporation, Espoo (FI)

( * ) Notice: Subject to any disclaimer, the term of this patent is extended or adjusted under 35 U.S.C. 154(b) by 1168 days.

(21) Appl. No.: 11/475,404

(22) Filed: Jun. 26, 2006

(65) Prior Publication Data
US 2007/0296703 A1    Dec. 27, 2007

(51) Int. Cl.
*H04M 1/00* (2006.01)
*H04M 9/00* (2006.01)
(52) U.S. Cl. .............................. 379/433.07; 379/433.01
(58) Field of Classification Search ............ 379/428.01, 379/433.06, 433.07, 433.01, 433.02, 433.04; 345/156, 168, 169; 455/90.3, 575.1
See application file for complete search history.

(56) References Cited

U.S. PATENT DOCUMENTS

2003/0227745 A1   12/2003   Khoo .......................... 361/686
2005/0007339 A1    1/2005   Sato ............................ 345/156
2005/0141179 A1    6/2005   Riddiford .................... 361/681
2005/0235021 A1   10/2005   Chen et al. .................. 708/142

FOREIGN PATENT DOCUMENTS

| | | |
|---|---|---|
| EP | 1628188 A1 | 2/2006 |
| GB | 2360738 A | 10/2001 |
| WO | WO-98/33111 | 7/1998 |

*Primary Examiner*—Tuan D Nguyen
(74) *Attorney, Agent, or Firm*—Harrington & Smith

(57) ABSTRACT

A keypad arrangement and keypad arrangement of a handheld device implements a 12-key keypad to optimize space utilization on a handheld device. The display area on a user viewable side may occupy 25% or more of the available user side surface of the handheld device. The keypad is arranged as a three row by four column matrix. The number sign special function key may remain adjacent to the number 9 key of a standard keypad to facilitate effective changeover for the user when switching from a standard keypad.

18 Claims, 5 Drawing Sheets

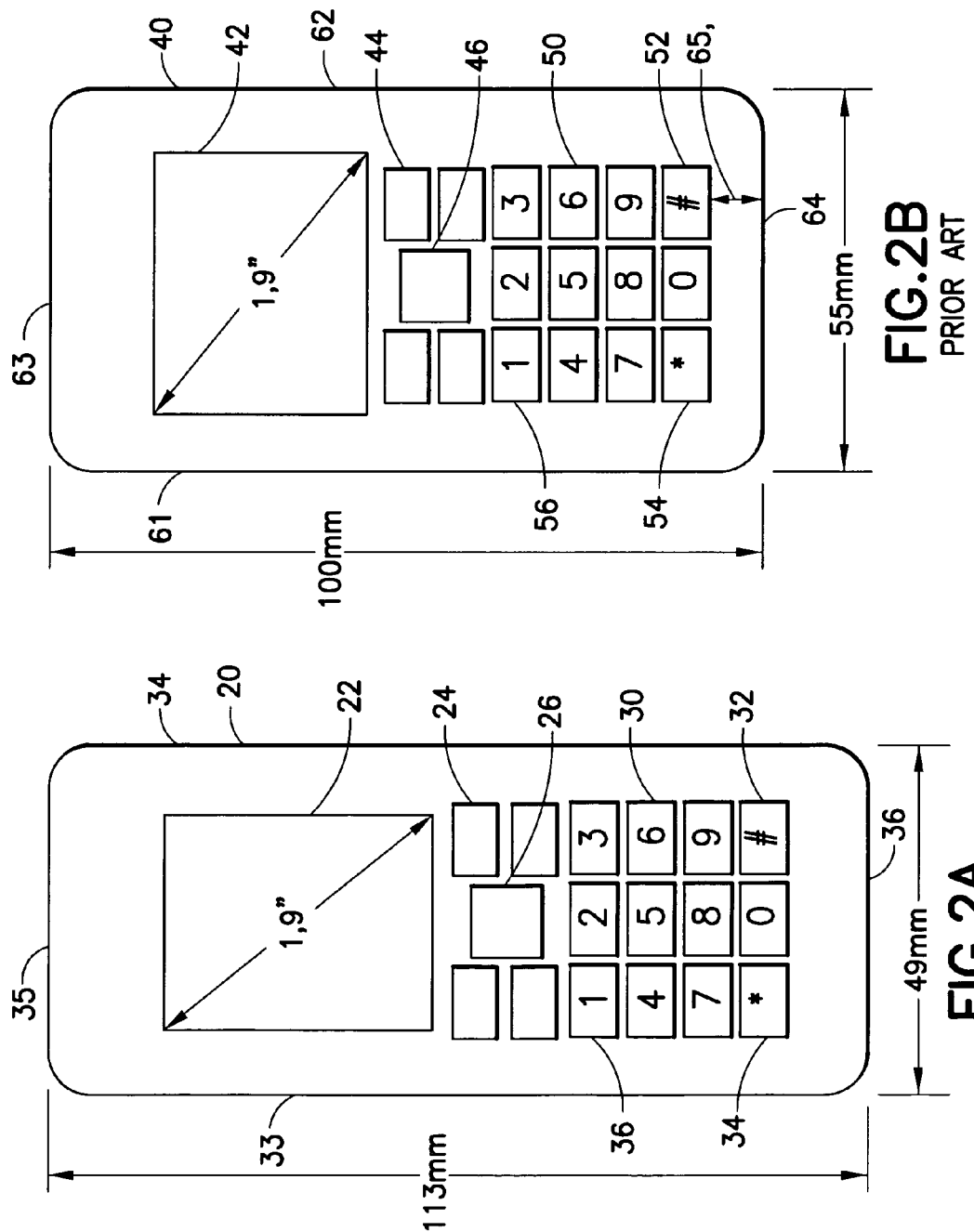

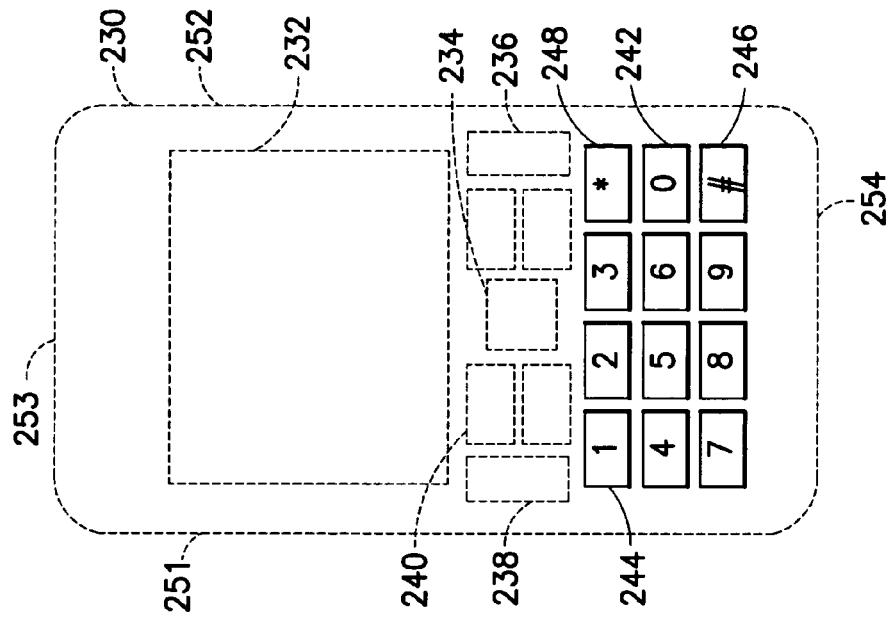
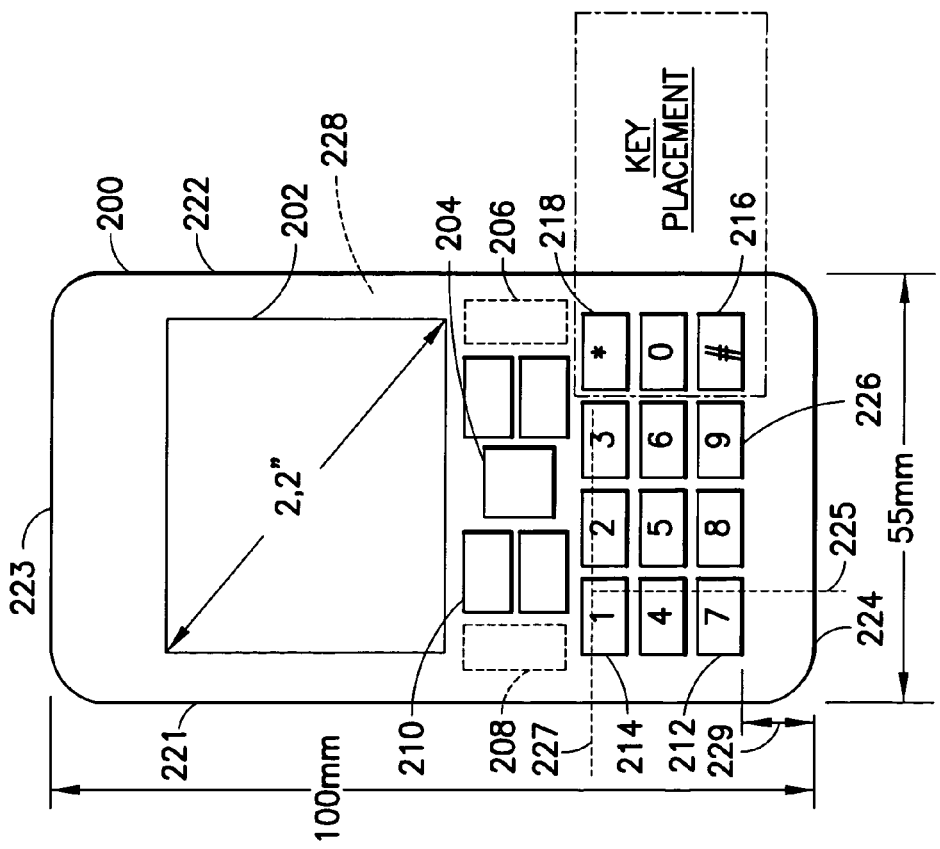

FOUR COLUMN KEYPAD

FIELD OF THE INVENTION

The invention relates to keypads, in general, and to keypads in handheld devices, in particular.

BACKGROUND OF THE INVENTION

Handheld devices are currently very popular and range in the capabilities offered. Handheld devices may be used to perform arithmetic or higher math calculations, wirelessly control electronic devices, allow communications between two or more people through telephone services, keep track of inventory, etc. As handheld devices have matured technologically, the size of the device has been in the process of being reduced, especially, for wireless handheld communication devices. Further, consumer and business interest are also driving the placement of ever large displays on the user viewable side of a wireless handheld communication and other handheld devices. Predictive text implementations may reduce the need for a QWERTY keyboard to a reduced size keyboard and even to the size of a standard keypad 2, as illustrated in FIG. 1, consisting of 10 alphanumeric keys 6 and two special keys 12 and 14, in a three column 10 by four row 8 arrangement (i.e., 3×4 arrangement).

The wireless communications devices 20, 40 represent two known devices having a display 22, 42 disposed above web browser keys 24, 26, 44, 46 that are above standard keypads 30, 50, each keypad having numeric keys 36, 56, an asterisk key 34, 64, and number sign key 32, 52. The wireless communications devices 20, 40 are, respectively dimensioned at 113 mm. by 49 mm. and 100 mm. by 55 mm. Each wireless communications device 20, 40 has a left side 33, 61, a right side 34, 62, a top side 35, 63, and a bottom side 36, 64 as viewed by a user looking at the display and keypad side of the device. As shown in FIG. 2A, the standard keypad 30 shares a user viewable side of a wireless communications device 20 with a display 22 and special keys 32 and 34 that are used to navigate a user interface of display 22. As consumer demand drives the development of more compact handheld device form factors and drives the implementation of larger displays on handheld devices, difficulties arise in placement and sizing of the 3×4 standard keypad. For example, in the more compact device in FIG. 2B, the margin 65 between the keypad 50 and the bottom edge 65 of the handheld device 40 becomes critical for placement of a speaker.

Current trends in the marketplace include horizontal displays. Horizontal displays tend to make the standard keypad format too narrow, or not used efficiently. Keypad formats currently found are illustrated in FIGS. 3A to 3C.

The wireless communications devices 100, 130, 160 represent devices having a display 102, 132, 162 disposed above or to the side of a keypad 110, 140, 164. These keypad formats include increase the number of keys below or to the side of the display to allow a user to implement browser functions as well as to enter telephone numbers. The effect of this is to increase the inconvenience of locating keys when using the handheld device. In FIG. 3A, although the web browser keys are separate from the keypad 110, other non-standard-keypad keys (e.g., telephone send and end keys and MP3) keys have been incorporated into an expanded keypad 110 that may prove inconvenient for a user because of the number of keys and the placement of the asterisk and number sign keys in locations that deviate notably from the familiar standard keypad 2. FIGS. 3B and 3C present wireless communications devices that surround the standard keypad 152, 178 with number 138, 172, asterisk 144, 166, and number sign 142, 168 keys with browser function and non-standard-keypad keys 134, 135, 136, 146, 180. Because of the number of keys in the expanded keypad 140, 164, locating standard keypad keys may prove inconvenient for a user. When a user views the display and keypad of each of the wireless communications devices 100, 130, 160, there is a left side 123, 147, 173, a right side 124, 148, 174, a top side 125, 149, 175, and a bottom side 126, 150, and 176.

A need exists for making the conventional keypad (or, keymat) shorter without comprising usability and to overcome the above noted problems with the prior art.

SUMMARY OF THE INVENTION

In a first aspect of the invention, a keypad arrangement for use with a handheld device, comprises a substantially two dimensional matrix of keys on a user viewable surface of a handheld device, wherein the user viewable surface has a left side, a right side, a top side, and a bottom side as viewed by a user viewing the user viewable surface, the substantially two dimensional matrix of keys having a plurality of rows of keys and a plurality of columns of keys, wherein three columns of keys, corresponding to the leftmost columns of keys in the keypad arrangement, having a primary designation of all numeric keys.

In a second aspect of the invention, a handheld device, includes a housing that includes internal electronic processing circuitry for performing at least one function, the housing having a plurality of apertures on a user viewable side of the handheld device, the user viewable side having a top side, a left side, a bottom side, and a right side; a display mounted in one of the plurality of apertures, the display being electronically coupled to the internal electronic processing circuitry; a keypad that includes a substantially two dimensional matrix of keys that project through at least one of the apertures of the plurality of apertures, the substantially two dimensional matrix including columns and rows, the keypad providing user input to the handheld device, the keypad having an arrangement in which the keys are arranged in columns and rows, the leftmost column of the keypad having a primary designation as all numeric keys, wherein the number of columns of the keypad is greater than the number of rows of the keypad.

BRIEF DESCRIPTION OF THE DRAWINGS

The foregoing and other aspects of these teachings are made more evident in the following Detailed Description, when read in conjunction with the attached drawings, wherein:

FIGS. 2A and 2B illustrate prior art keypad arrangements;

FIG. 4 illustrates an embodiment of the invention as a handheld device; and

FIG. 5 illustrates an embodiment of the invention as a keypad of a handheld device with ornamental aspects.

DETAILED DESCRIPTION

Non-limiting embodiments of the invention are further described below. However, it should be appreciated that some of the features of the embodiments of the invention could be used to advantage without the corresponding use of other features. As such, the foregoing description should be considered as merely illustrative of the principles of the invention, and not in limitation thereof. Further, one skilled in the art will appreciate that the invention can be practiced by other than the described embodiments; that these described embodiments are presented for the purposes of illustration and not of limitation.

Figure 1:
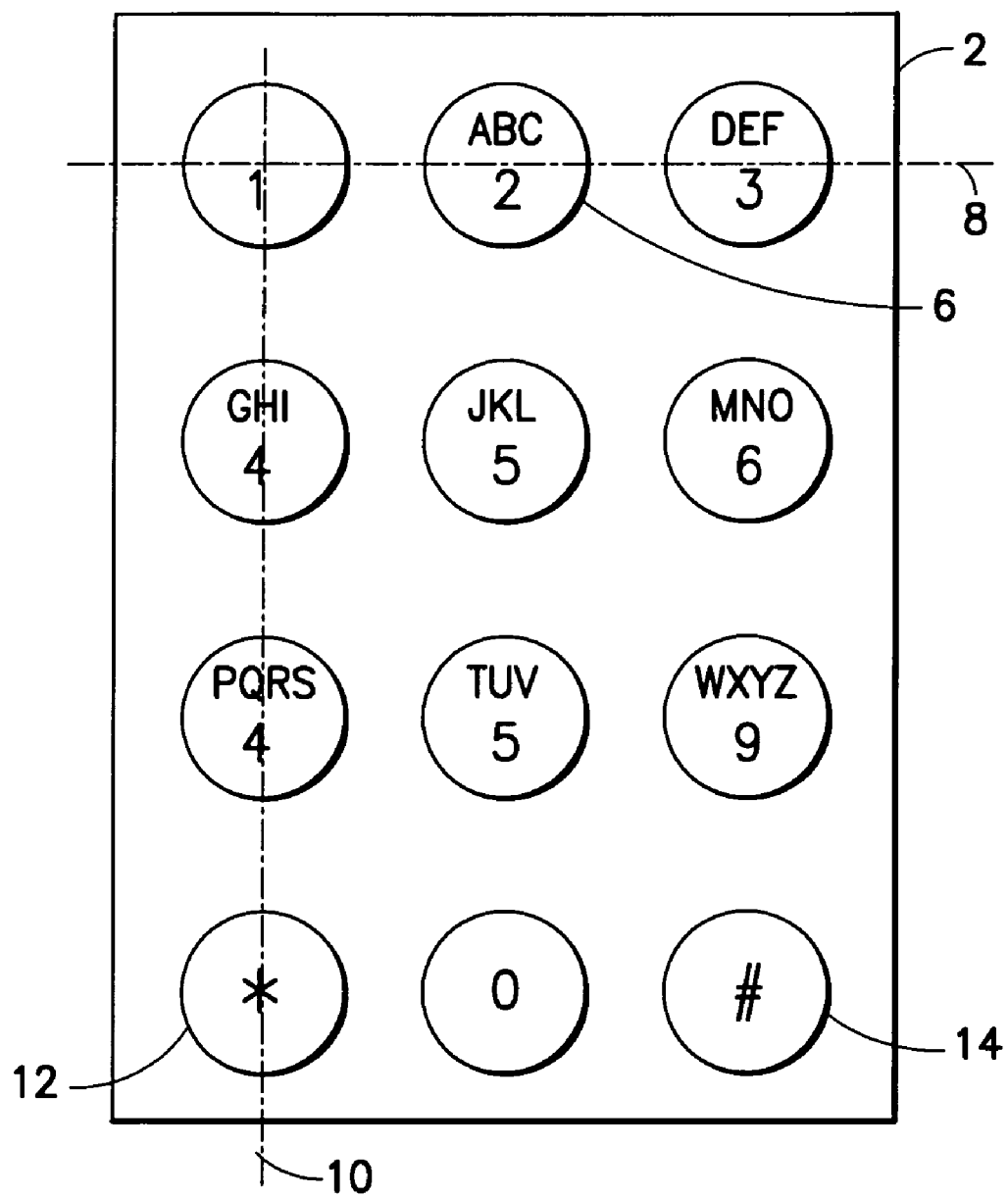
FIG. 1 illustrates a standard 12-key standard keypad.
Figure 3A:
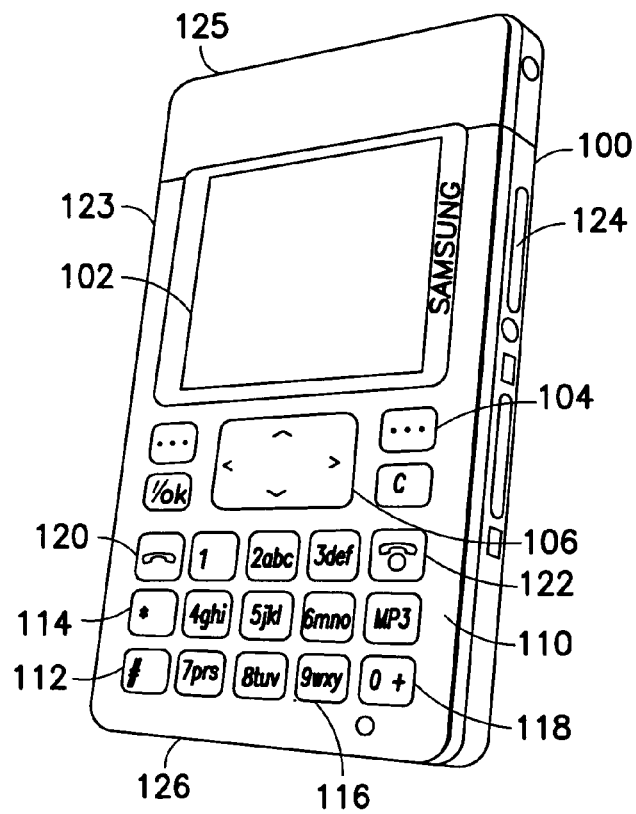
FIGS. 3A to 3C illustrate other prior art keypad arrangements.
Figure 3B:
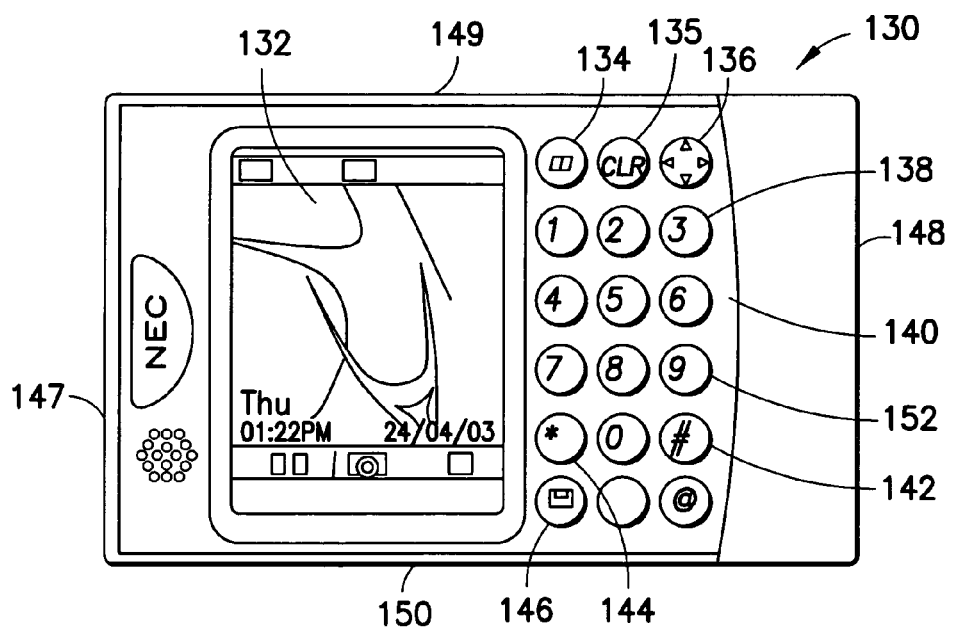
Figure 3C:
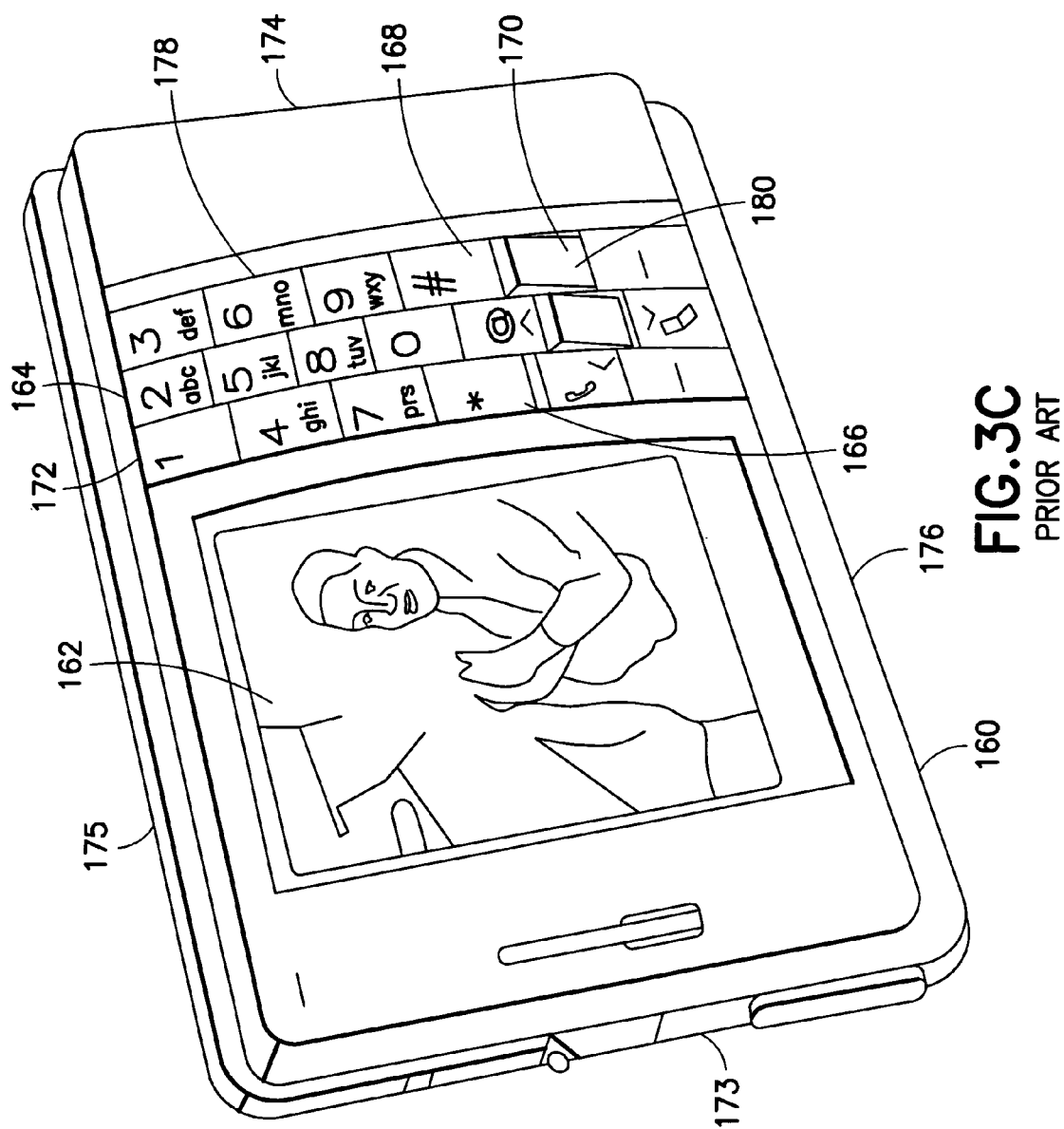

Embodiments of the invention relate to a standard telephone keypad (or, keymat) layout for a handheld electronics device. In an embodiment, an adaptation of a twelve key International Telecommunications Union—Telecommunications Standards Sector (12-key ITUT) standard keypad (see FIG. 1) is presented. In the 12-key ITUT, there are individual keys for each digit 0-9 and two special function keys. The two special function keys may be a number sign and an asterisk, for example. Different geographic regions may use different nomenclatures for the two keys. For example, the number sign may alternatively be referred to as an octothorp, hash sign, numeral sign, pound sign, cross-hatch, square, comment sign, pig-pen, cross hatch, mesh, fence, or picket. Also, the asterisk may be alternatively referred to as a star, splat, Arabic star, or palm.

The invention provides a keypad arrangement to facilitate the location of digits without undue obstructions, facilitates left to right digit entry, accommodates shorter device lengths, provides for a display area of about 25% or more (e.g., about 29%) of the user viewable area of the handheld device, allows for greater margins between the keypad and the edge of the device for placement of a speaker and receiver in the device, and reduces the risk of device breakage by a form factor that is less elongated. The invention provides a handheld device, such as a wireless communications device, that incorporates the inventive keypad arrangement. The invention further relates to an ornamental design of a handheld, portable device keypad, as shown in FIG. 5.

The Dual-Tone-Multi-Frequency (DTMF) is used for telephone information transmission to establish a communication link. The International Telecommunications Union—Telecommunications Standards Sector has established a standard for this technology in which a tonal chart for a four column and four row keypad is used. Each row of the keypad may be assigned a unique audible frequency and each column may be assigned a unique audible frequency. In standard telephone keypads, the fourth column of the DTMF tonal chart is not used. In an embodiment of the keypad 212 of the invention, as shown in FIG. 4, the fourth row of a standard telephone keypad 2 may be translated to the right by one key and rotated up such that the number sign key 216 remains adjacent to the number 9 key 226. A 4×3 layout (rather than a 3×4 layout) allows for efficient use of the user facing surface of a handheld device and accommodate displays that form. This configuration may help the user to switch from standard keypad usage to the keypad of the invention with minimal inconvenience. An example of a tonal chart layout for a keypad of an embodiment of the invention is provided in the table below:

| DTMF Tonal Chart of an Embodiment of the Keypad of the Invention | | | | | |
|---|---|---|---|---|---|
| 1 | 2 | 3 | 697 Hz | * | 1209 Hz |
| 4 | 5 | 6 | 770 Hz | 0 | 1336 Hz |
| 7 | 8 | 9 | 852 Hz | # | 1477 Hz |
| 1209 Hz | 1336 Hz | 1477 Hz | | 941 Hz | |

In an embodiment of the invention, a keypad 212 for use with a handheld device includes a substantially two dimensional matrix of keys on a user viewable surface of a handheld device wherein the matrix of keys has a depth as well as a height and a length and may be in a flat, planar form, a bowed in or bowed out form, or other suitable configuration. The substantially two dimensional matrix keypad arrangement may be essentially rectangular such that keys in a column 225 may be disposed one above another and the keys in a row 227 may be disposed rectilinearly with respect to one another. The user viewable surface has a left side 221, a right side 222, a top side 223, and a bottom side 224 as viewed by a user viewing the user viewable surface. Toward the top side 223 may be disposed a display 202, such as a liquid crystal display. The display may occupy 25% or more the user viewable surface so as to present an easy to read or more informational representation of data and/or images. For example, the display may occupy about 27%, about 28%, or about 29% of the user viewable surface of the handheld device when used by a user in which the handheld device may have a 10.0 cm. by 5.5 cm. user viewable surface area (with rounded corners) where the display measures 4.4 cm. by 3.6 cm. as shown in FIG. 4. In an embodiment, the substantially two dimensional matrix of keys has a three rows 227 of keys and four columns 225 of keys. In this embodiment, as illustrated in FIG. 4, the left three columns 225 of keys are primarily designated as numeric keys 214; that is, the primary association of that key is with a number, although a secondary designation may be as one or more alphabetic characters, as in a standard telephone keypad (e.g., the '2' key may be secondarily designated with the letters ABC). In this embodiment, the fourth column includes two special function characters 216, 218 and another key primarily designated as numeric. As shown in FIG. 4, the two special function keys may be a number sign key 216 and an asterisk key 218. The layout of FIG. 4 may be achieved by translating the fourth row of FIG. 1 one key to the right and one key up and rotating the fourth row to become the fourth column. In this manner, a user familiar with a standard keypad needs to make less adjustment to the keypad 212 of the invention because the number sign key 216 remains adjacent to the number 9 key 226 and the key order of the fourth column follows that of the fourth row of the standard keypad 2.

FIG. 4 further illustrates an embodiment of a handheld device of the invention. The handheld device has a housing and a display 202 positioned within an opening of the housing proximate a first end of the housing and a keypad 212 positioned within at least one opening of the housing proximate a second end of the housing. The housing may have a first portion and a second portion that are attachable and detachable with respect to each other and may be bonded together through snaps, hooks, clasps, and/or adhesives, wherein the second portion is fixedly attached to along all or part of the length of the first portion. The first and second portions of the housing may be formed of molded plastic or other suitable material. The keypad 212 may be formed of a molded sheet of plastic that fits within apertures in a user viewable face of the housing.

The handheld device 200 includes internal electronic processing circuitry 228 for performing at least one function, the housing having a plurality of apertures on a user viewable side of the handheld device 200, the user viewable side having a top side 223, a left side 221, a bottom side 224, and a right side 222. A display 202 is mounted in one of the plurality of apertures and is electronically coupled to the internal electronic processing circuitry 228. In an embodiment, the display 202 may be a liquid crystal display. A keypad 212 that includes a substantially two dimensional matrix keys may project through at least one of the apertures of the plurality of apertures. The keypad 212 may have an arrangement in which the keys are arranged in columns and rows in which the leftmost column of the keypad having a primary designation as all numeric keys and the number of columns of the keypad is greater than the number of rows of the keypad. A margin 229 between the keypad 212 and the bottom side 224 is sufficiently large for placement of a speaker in the handheld device 200.

Between the keypad and the display, a set of keys 204, 206, 208, 2100 may be disposed. This set of keys may include a navigation key 204, a send key, and an end key. FIG. 4 shows that the set of keys may be five or seven in number. A feature of the invention is that the keys of a standard keypad of ten digits and two special characters remain physically separated from browser related and other non-standard-keypad keys of the user interface of display 202 to reduce confusion for a user.

FIG. 5 shows an embodiment of an ornamental design of the keypad for a handheld portable electronic device 230. In this embodiment, the keypad 244 has four columns and three rows of keys in which the leftmost three columns of keys may have primary designations as being numeric, being number from '1' through '9,' and the rightmost column of keys may be, from top to bottom, may be designated as the asterisk key ('*' key) 248, the '0' key 242, and the number sign key ('#' key) 246. In this embodiment, the handheld portable electronic device 230 has a display 232 and web browser and other non-standard-keypad keys 234, 236, 238, 240, in addition to the keypad 244. For reference, when the display and keypad face a user, the handheld portable electronic device 230 has a left side 251, a right side 252, a top side 253, and a bottom side 254.

In an alternate embodiment, the keypad of the invention could be used with any suitable size and shape housing of a handheld portable device, such as a handheld portable electronic device or a handheld portable wireless communications device. An example of a handheld portable electronic device and a handheld portable wireless communications device is a mobile telephone or mobile station. Other examples of handheld portable electronic devices include calculators, handheld computing devices, inventory control devices, and the like.

It is believed that the invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A handheld device, comprising:
   a user viewable surface comprising a left side, a right side, a top side, and a bottom side as viewed by a user viewing the user viewable surface;
   a display disposed on the user viewable surface;
   a keypad comprising a matrix of first keys on the user viewable surface, wherein the matrix of first keys comprises a plurality of rows of the first keys and a plurality of columns of the first keys, wherein a first three of the columns of keys, corresponding to leftmost columns of keys in the matrix have a primary designation of all numeric keys, and wherein the number of columns of the first keys is greater than the number of rows of the first keys;
   a set of second keys disposed on the user viewable surface between the display and the keypad, wherein the set of second keys includes at least one function key; and
   a speaker disposed on the user viewable surface between the keypad and the bottom side of the user viewable surface.

2. A handheld device according to claim 1, wherein a fourth column of the first keys of the keypad includes a numeric key.

3. A handheld device according to claim 2, wherein the fourth column of the first keys of the keypad includes two special function keys.

4. A handheld device according to claim 3, wherein the two special function keys are a number sign key and an asterisk key.

5. A handheld device according to claim 4, wherein a top key of the first three columns of the first keys of the keypad is numbered, from left to right, '1,' '2,' and '3.'

6. A handheld device according to claim 5, wherein a middle key of the first three columns of the first keys of the keypad is numbered, from left to right, as '4,' '5,' and '6,' and, a bottom key of the first three columns of the first keys of the keypad is numbered, from left to right, as '7,' '8,' and '9.'

7. A handheld device according to claim 6, wherein the fourth column, from top to bottom is marked with an asterisk, '0,' and a number sign.

8. A handheld device according to claim 1, further comprising:
   a housing that includes internal electronic processing circuitry for performing at least one function, the housing having a plurality of apertures on the user viewable side of the handheld device;
   wherein the display is configured to mount in one of the plurality of apertures, and is configured to be in communication with the internal electronic processing circuitry;
   wherein the matrix of the first keys of the keypad are configured to project through at least one of the apertures.

9. A handheld device according to claim 1, wherein the set of second keys includes a navigation key.

10. A handheld device according to claim 9, wherein the set of second keys includes a send key and an end key.

11. A handheld device according to claim 1, wherein the set of second keys includes five keys.

12. A handheld device according to claim 1, wherein the set of second keys includes seven keys.

13. A handheld device according to claim 1, wherein a leftmost column of the keys of the keypad has a primary designation as, from top to bottom, as '1,' '4,' and '7,' and wherein the '4' key has a secondary designation of 'G,' 'H,' and 'I' and the '7' key has a secondary designation of 'P,' 'Q,' 'R,' and 'S.'

14. A handheld device according to claim 13, wherein none of the keys of the rightmost column of the keys of the keypad has a secondary designation.

15. A handheld device according to claim 1, wherein the display comprises at least 25% of the user viewable surface.

16. A handheld device according to claim 1, wherein the handheld device is a wireless communications device.

17. A handheld device according to claim 1, wherein the navigation key is a web navigation key.

18. A handheld device according to claim 8, wherein the keypad is disposed proximate the bottom side of the handheld device and the display is disposed proximate the top side of the handheld device.

* * * * *